United States Patent [19]
Nuscher

[11] Patent Number: 5,190,340
[45] Date of Patent: Mar. 2, 1993

[54] GOLF CART REAR ROOF UNIT

[76] Inventor: Edwin H. Nuscher, 514 Barberry Rd., Savannah, Ga. 31419

[21] Appl. No.: 887,893

[22] Filed: May 26, 1992

[51] Int. Cl.⁵ .......................................... B62D 25/06
[52] U.S. Cl. ................................. 296/99.1; 296/77.1; 296/102; 280/DIG. 5; 135/88
[58] Field of Search ..................... 296/77.1, 99.1, 102, 296/210; 280/DIG. 5; 135/88

[56] References Cited

U.S. PATENT DOCUMENTS

| | | | |
|---|---|---|---|
| 4,830,037 | 5/1989 | Held | 280/DIG. 5 X |
| 5,010,941 | 4/1991 | Ross, Sr. et al. | 280/DIG. 5 X |
| 5,069,481 | 12/1991 | Strange | 280/DIG. 5 X |

Primary Examiner—Dennis H. Pedder
Attorney, Agent, or Firm—Willard M. Hanger

[57] ABSTRACT

A canopy assembly for attaching a rearwardly extending protective rooftop to a motorized golf cart to overlie a substantial distance above the normally unprotected golf bag compartment rearwardly of the cart seating compartment and a protective cover extending over the seating compartment. The asembly includes an L-shaped roof having a vertically extending front face and a backswept, horizontally extending top section along the length of which attached support bars extend of which the lower end portions protrude below the lower edge of the roof front face and slidably and retainably fit into the interior of the spaced apart vertically extending holding tubes of an attaching frame affixed to the vertically extending rear stanchions supporting the cart protective cover with the lower end of the the roof front face contacting the cart protective cover and the backswept top section of the L-shaped roof extending across the golf bag compartment a substantial distance above the compartment and the cart protective cover.

10 Claims, 3 Drawing Sheets

GOLF CART REAR ROOF UNIT

BACKGROUND OF THE INVENTION

This invention relates to a canopy roof that is attachable to a motorized golf cart in which the roof provides weather protection over the normally unprotected golf club compartment at the rear of the cart.

Motorized golf carts commonly have a protective cover which extends only over the forward seating compartment, leaving the golf bag compartment in the rear of the cart back of the seating compartment open and unprotected from the weather. This leaves the golf bag and clubs and other articles stowed in the golf bag compartment unprotected from rain and other deteriorating weather conditions.

Various curtain arrangements have been utilized, such as the collapsible rear compartment canopy attachment disclosed in U.S. Pat. No. 4,830,037. However, such arrangements require the protective cover or curtain to be removed to obtain access to the rear compartment and the golf bag in order to remove the golf clubs or other items stowed in the golf bag compartment. Further, caddies, golfing partners and others frequently find the rear step extending rearwardly of the golf bag compartment on many carts convenient for short distance transportation. Weather protection for these persons on the rear step is desirable.

An object of this invention is to provide a rearwardly extending protective rooftop attachable to the motorized golf carts creating a protective roof that extends rearwardly above the rear golf bag compartment and provides ready access at all times to the golf bag and other items in the rear golf bag compartment.

Another object of the invention is to provide a detachable protective rooftop that extends rearwardly of a motorized golf cart seating compartment protective cover and extends over the rearmost section of the cart of a height above the rear compartment as accommodates personnel riding on the rearmost portion of the golf cart.

A further object of the invention is to provide a supplementary rain rooftop for a motorized golf cart that protrudes rearwardly of the seating compartment protective cover to extend rearwardly across the golf club compartment and is quickly and easily attachable and detachable from the cart.

SUMMARY OF THE INVENTION

The invention involves a canopy assembly which installs a rearwardly extending protective rooftop onto a motorized golf cart of which the components are an L-shaped roof along the interior length of which laterally spaced apart L-shaped support bars are attached, the lower ends of the support bars extending below the front face of the L-shaped roof slidably retainably fit into spaced apart holding tubes of an attaching frame that extends laterally of and is attached by fittings to the vertically extending stanchions which support the protective cover of the golf cart seating compartment. The support bars detachably fitting into and retained by the attaching frame position the front face of the L-shaped roof in contact with the cart seating compartment cover with the top backswept top portion of the L-shaped roof extending rearwardly of and spaced a substantial distance above the seating compartment cover to overlie the rear golf bag compartment.

DETAILED DESCRIPTION OF THE INVENTION

Figure 1:
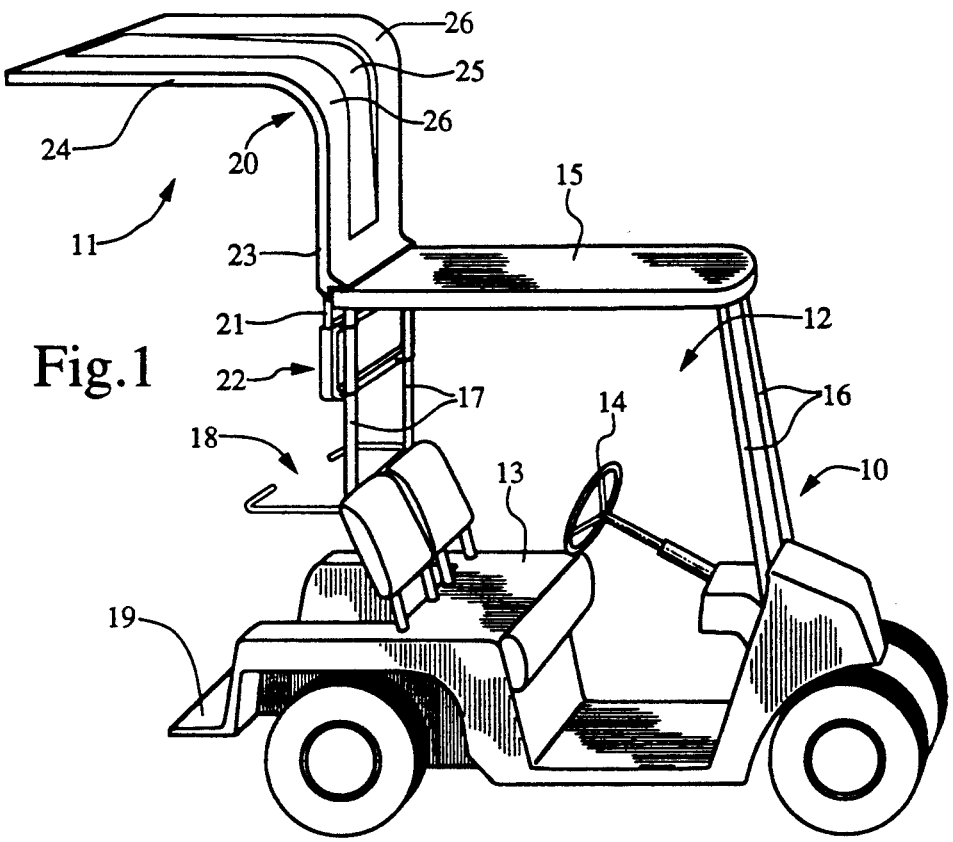
FIG. 1 is a perspective view of a motorized golf cart with the rear protective rooftop installed on the cart.
Figure 4:
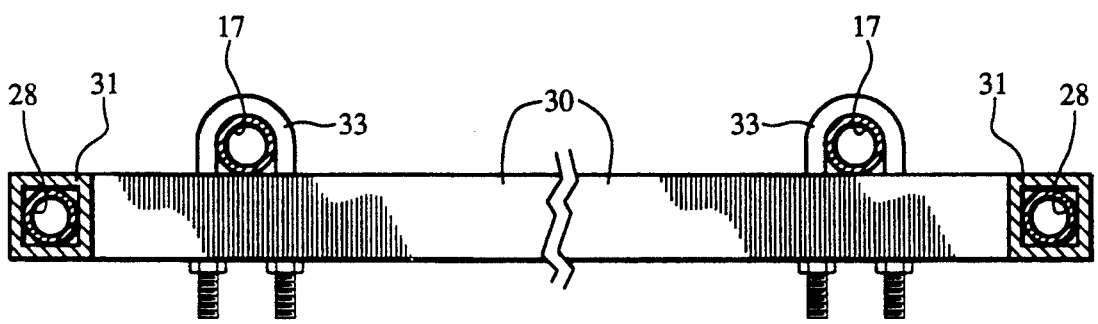
FIG. 4 is a horizontal section along section line 4—4 of FIG. 3.

First referring to FIG. 1, a motorized golf cart 10 is shown having a rear protective rooftop unit 11 attached to the cart 10 by the canopy assembly of the present invention. The illustrated golf cart 10 is the conventional type, having a seating compartment 12 in which the occupants are seated on a seat 13 behind the steering wheel 14 with a protective cover 15, supported by pairs of vertically extending front stanchions 16 and rear stanchions 17, overlying the seating compartment 12. A golf bag compartment 18 located in back of the seating compartment 12 extends rearwardly beyond the protective cover 15 overlying the seating compartment and behind the rear support stanchions 17, a foot stand 19 at the rear end of the golf bag compartment 18 providing a convenient place for caddies and others to ride short distances on the cart. The golf bag compartment 18 and region behind the seating compartment protective cover rear support stanchions 17 of conventional golf carts normally are unprotected and the present invention comprises the canopy assembly constituting the rear protective top unit 11 illustrated in FIG. 1 that provides weather protection extending over and a substantial distance above the normally unprotected golf bag compartment.

As explained in further detail with respect to other Figures, the canopy assembly of this invention attaches the L-shaped roof 20 to the vertically extending stanchions of the cart top by roof support bars 21 that are slidably retained in an attaching frame 22 which is clamped to the protective cover rear support stanchions 17 with the front face 23 of the roof extending vertically from the rear edge of the cart protective cover 15 and the horizontal backswept top portion 24 of the roof 20 extending rearwardly to overlie the golf bag compartment and rear step 19. The roof 20 most conveniently can be a molded plastic section of which a depressed central area 25 on the upper and lower sides of the rounded L-shaped roof section is slightly thinner than the side portions 26 to save weight. However, the material of the roof 20 can be fiberglass or various types of light metals. The vertical extent of the roof front face 23 is such that the backswept top portion 24 of the roof is spaced a sufficient distance above the golf bag compartment 18 and foot stand 19 as will accommodate a person of average height.

Figure 2:
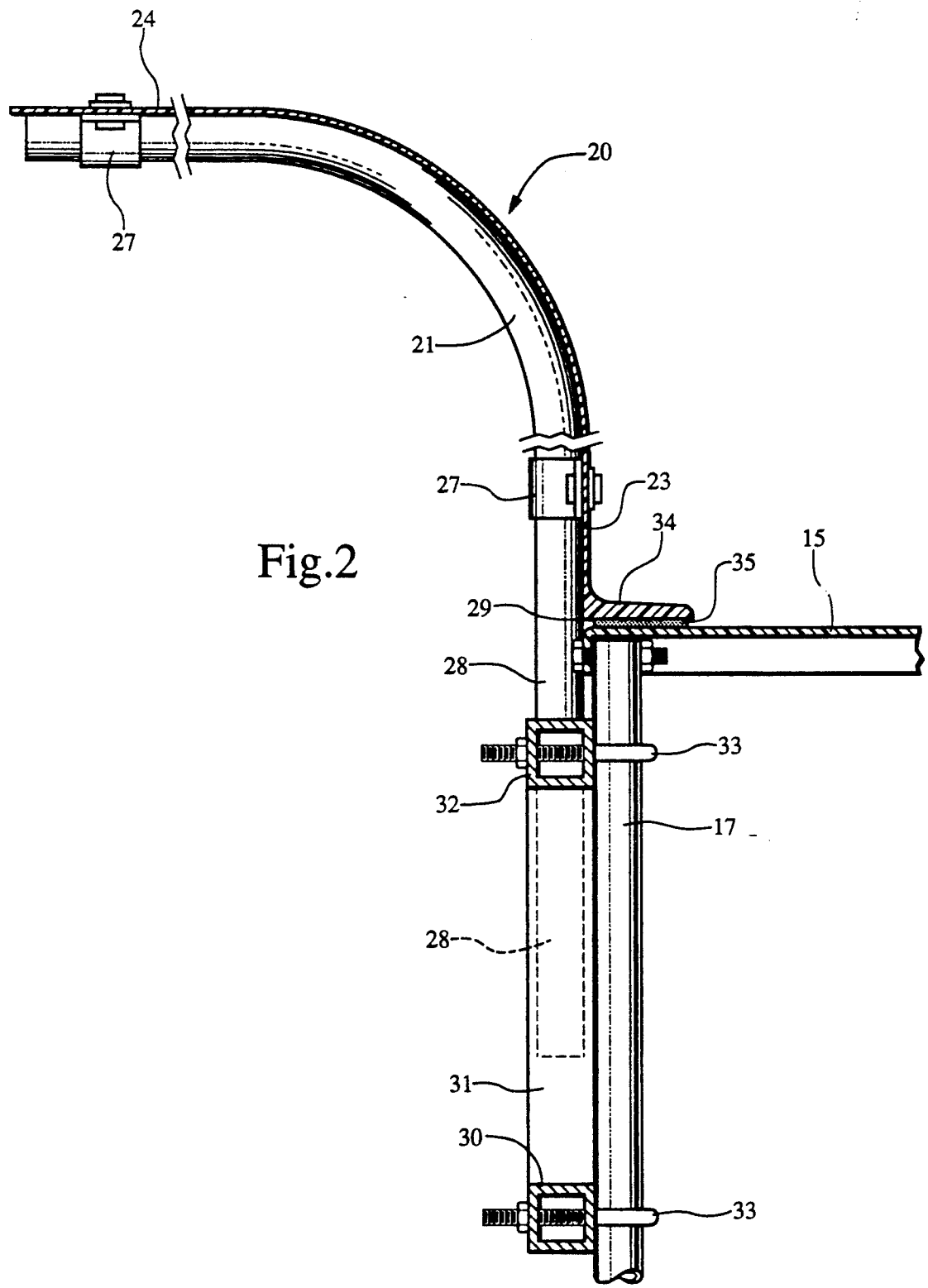
FIG. 2 is a vertical section along section line 2—2 of FIG. 3.
Figure 3:
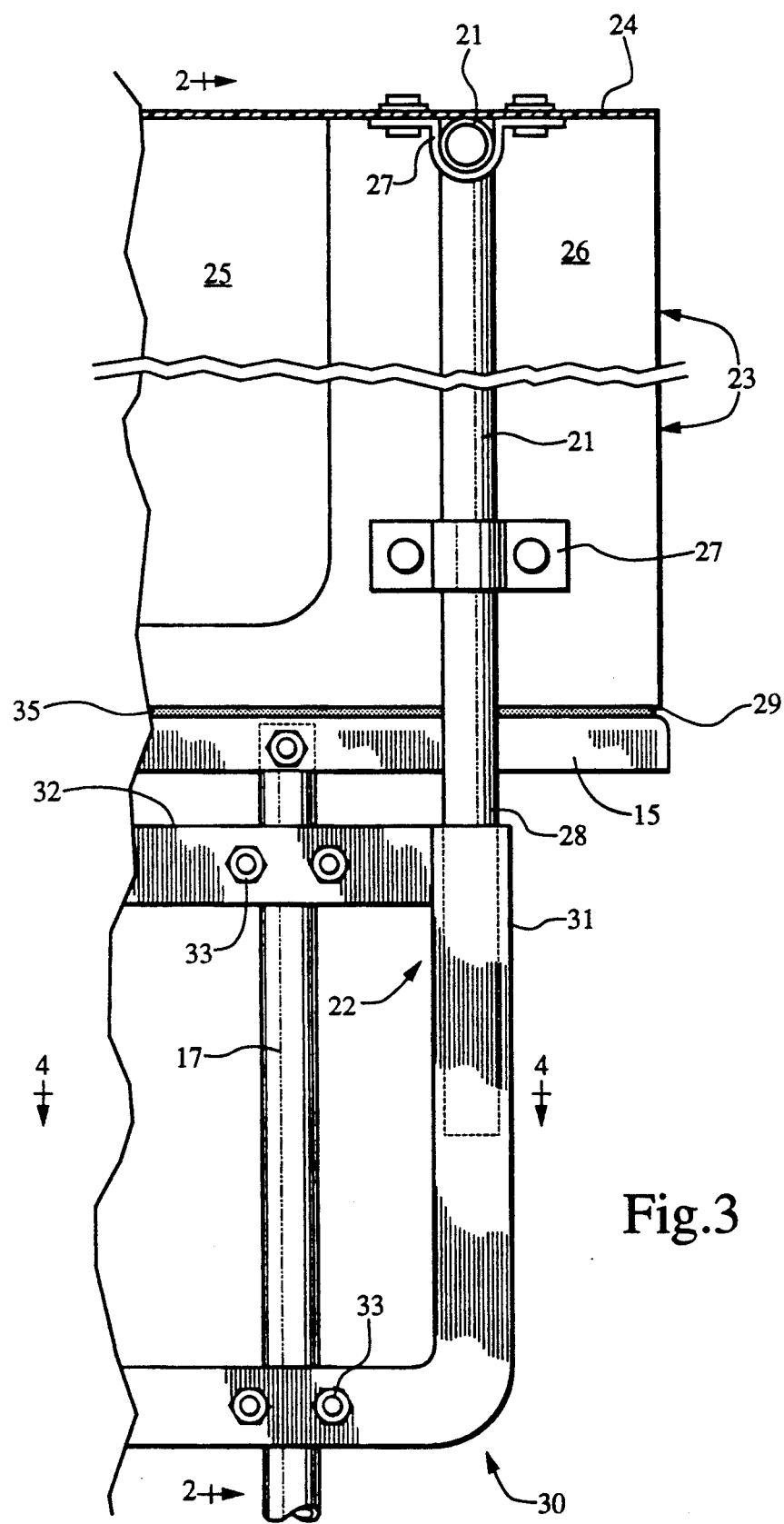
FIG. 3 is a partial rear elevation of the installed rooftop canopy assembly.

Referring now to FIG. 2, a pair of L-shaped roof support bars 21 configured to conform to the lengthwise configuration of the underside of the roof 20 are affixed to the roof to extend along the underside of the roof by attachment clips 27 with the lower end portion 28 of each support bar 21 extending beyond the lower edge 29 of the roof front face 23. A tubular attaching frame 22, comprising a U-shaped lower section 30 having the top ends of its upstanding tubular side sections 31 welded to a cross-tube section 32, is attached to the rear cover stanchions 17 by bolt fastenings 33. The hollow interior of the attaching frame upstanding tubular side sections 31, of which the top ends are open, is dimensioned to receive and securely retain a length of the roof support bar lower end portions 28 inserted therein, the support bars 21 affixed to the respective roof side portions 26 being spaced apart a distance that the roof support bar lower end portions 28 are in registration with the hollow interior of the attaching frame upstanding side portion holders 31. The bottom portion of the roof front face 23 is formed to have an outwardly extending lip 34 that overlies the cart protective cover 15 when the roof 20 is in the attached position with the roof support bar lower end portions 28 fully inserted into the attaching frame side holders 31, a sealing gasket 35 preferably being installed between the lip 34 and the cart cover 15.

As is readily apparent, the rooftop cover 11 is readily and quickly attachable and detachable by merely lowering or raising the roof 20 with attached support bars 21 a sufficient amount that the support bar lower end portions 28 are inserted into or removed from the interior of the attaching frame spaced apart tubular side holders 21. Conveniently, the attaching frame 22 remains attached to the golf cart rear stanchions 17 since the attaching frame is small and mounted sufficiently high on the rear stanchions 17 as not to obstruct the golf bag compartment area.

It should be understood that the foregoing disclosure describes one preferred embodiment of the invention and that numerous modifications or alterations may be made therein without departing from the spirit and scope of the invention as set forth in the appendant claims. For example, the spacing between the roof support bars 21 could be that of the spacing between the cart cover rear stanchions 17 and the attaching frame could constitute a pair of roof bar support holding clamps that were affixed to the rear cart cover stanchions and configured to extend rearwardly of the rear stanchions sufficiently to be in registration with the roof support bar lower end portions.

What is being claimed is:

1. A canopy assembly for attaching a rearwardly extending rooftop to a golf cart having a golf bag compartment located rearwardly of a seating compartment over which a protective cover is supported by laterally spaced apart front and rear vertically extending stanchions, said canopy assembly comprising:
   an L-shaped roof having a front face disposed substantially normal of a backswept top section,
   a pair of L-shaped roof support bars configured to conform to a lengthwise configuration of said roof,
   means connecting said roof support bars to said roof to extend lengthwise of said roof in a spaced apart relationship with a lower end portion of said support bars extending below a lower edge of said roof front face,
   roof attaching means including a pair of support bar holders each configured for secure retention of said roof support bar lower end portion and
   means affixing said roof attaching means to said cart top rear support stanchions disposing said support bar holders in a spaced apart array with each said holder in registration with a lower end portion of a roof support bar attached to said roof and said roof front face adjoining said cart protective cover, whereby said roof and cart are positioned in an attaching relationship with said roof backswept top section overlying the cart golf bag compartment.

2. The canopy assembly of claim 1 wherein each said support bar holder of said roof attaching means comprises an elongated tube having an open end and a hollow interior dimensioned to securely retain a length of said roof support bar lower end portion inserted therein.

3. The canopy assembly of claim 2 wherein said roof attaching means includes an elongated frame at opposite ends of which said support bar holders extend transversely of said frame.

4. The canopy assembly of any one of claims 1-3 wherein a lower portion of the exterior of said roof front face has a protuberance extending the width of said front face, said protuberance having a lower surface disposed in an overlying relationship to said cart cover with said roof in said cart attaching relationship.

5. The canopy assembly of claim 4 additionally comprising a gasket disposed between said protuberance lower surface and said cart cover.

6. In combination with a golf cart having a golf bag compartment located rearwardly of a seating compartment over which a protective cover is supported by laterally spaced apart front and rear vertically extending stanchions, the improvement of an attachable canopy assembly comprising:
   an L-shaped roof having a front face disposed substantially normal of a backswept top section,
   a pair of L-shaped roof support bars configured to conform to a lengthwise configuration of said roof,
   means connecting said roof support bars to said roof to extend lengthwise of said roof in a spaced apart relationship with a lower end portion of said support bars extending below a lower edge of said roof front face,
   roof attaching means including a pair of support bar holders each configured for secure retention of said roof support bar lower end portion and
   means affixing said roof attaching means to said cart top rear support stanchions disposing said support bar holders in a spaced apart array with each said holder in registration with a lower end portion of a roof support bar attached to said roof and said roof front face adjoining said cart protective cover, whereby said roof and cart are positioned in an attached relationship with said roof backswept top section overhanging the cart golf bag compartment.

7. The combination of claim 6 wherein each said support bar holder comprises an elongated tube having an open end and a hollow interior dimensioned to securely retain a length of said roof support bar lower end portion inserted therein.

8. The combination of claim 7 wherein said roof attaching means includes an elongated frame at opposite ends of which said support bar holders extend transversely of said frame.

9. The combination of any one of claims 6-8 wherein a lower portion of the exterior of said roof front face has a protuberance extending the width of said front face, said protuberance having a lower surface disposed in an overlying relationship to said cart cover with said roof in said cart attaching relationship.

10. The combination of claim 9 additionally comprising a gasket disposed between said protuberance lower surface and said cart cover.

* * * * *